United States Patent
Smith

(10) Patent No.: US 7,404,039 B2
(45) Date of Patent: Jul. 22, 2008

(54) DATA MIGRATION WITH REDUCED CONTENTION AND INCREASED SPEED

(75) Inventor: Max D Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 11/036,628

(22) Filed: Jan. 13, 2005

(65) Prior Publication Data

US 2006/0155950 A1 Jul. 13, 2006

(51) Int. Cl.
*G06F 12/00* (2006.01)
(52) U.S. Cl. ................................ 711/117; 711/170
(58) Field of Classification Search ................ 711/117
See application file for complete search history.

(56) References Cited

U.S. PATENT DOCUMENTS

| | | | |
|---|---|---|---|
| 4,771,375 A * | 9/1988 | Beglin et al. ............... 711/111 |
| 5,276,867 A | 1/1994 | Kenley et al. |
| 5,333,315 A * | 7/1994 | Saether et al. ................ 707/1 |
| 6,330,572 B1 * | 12/2001 | Sitka ........................ 707/205 |
| 2004/0054656 A1 | 3/2004 | Leung et al. |

OTHER PUBLICATIONS

IBM (1973) Technical Disclosure Bulletin.
IBM (1985) Technical Disclosure Bulletin.

* cited by examiner

*Primary Examiner*—Hyung Sough
*Assistant Examiner*—Craig E Walter
(74) *Attorney, Agent, or Firm*—Dan Shifrin

(57) ABSTRACT

Methods and apparatus are provided for managing data in a hierarchal storage subsystem. A plurality of volumes is designated as a storage group for Level 0 storage; a threshold is established for the storage group; space is allocated for a data set to a volume of the storage group; the data set is stored to the volume; the threshold is compared with a total amount of space consumed by all data sets stored to volumes in the storage group. Data sets are migrated from the storage group to a Level 1 storage if the threshold is less than or equal to the total amount of space used by all of the data sets stored to volumes in the storage group. Thus, contention between migration and space allocation is reduced.

10 Claims, 3 Drawing Sheets

US 7,404,039 B2

DATA MIGRATION WITH REDUCED CONTENTION AND INCREASED SPEED

TECHNICAL FIELD

The present invention relates to the efficient migration of data between storage levels in a hierarchal storage subsystem.

BACKGROUND ART

A data processing facility typically includes one or more host devices to which are attached storage devices, either directly or through a network. As a customer's business grows, the need for increased storage also grows. However, installing additional high speed storage devices, such as DASD (direct access storage device), can become expensive. Moreover, not all of a customer's storage may need to be of the expensive, high speed variety. Rather, such storage may be allocated to data which is to be accessed frequently while less frequently accessed data may be stored on slower and less expensive storage devices, such as tape cartridges. Storage with multiple levels is said to be configured as hierarchal storage.

The operating system of the host may include a hierarchal storage manager. The OS/390® or z/OS® operating system which operates on an IBM® S/390® server may include a Data Facility Storage Management Subsystem (DFSMS™) which automates storage management policies and procedures to move data up and down a storage hierarchy. It will be appreciated that other vendors may provide other products which also manage hierarchal storage space. And, while the present invention will be described in the context of DFSMS from IBM, the invention is not limited to being incorporated into that particular product.

One component of DFSMS is the hierarchal storage manager (DFSMShsm™, also referred to herein as "HSM") which oversees backup, recovery, migration and space management operations. One of the functions provided by the space management function of DFSMShsm is "interval migration" which directs the periodic migration of data sets to locations where they are stored less expensively or in a form which saves space. HSM interval migration automatically manages volumes in DASD storage space (also known as Level 0) based upon user-specified constructs. Volumes storing data sets which have common storage requirements, as defined by the customer, may be grouped together in "storage groups". One of the parameters which the customer may select for a volume is a "high threshold". At predetermined intervals, HSM examines DASD volumes in alphabetical order and determines whether the space used by the data sets stored to a volume exceed the high threshold. If so, data sets in that volume are eligible for migration from Level 0 to Level 1 (such as DASD/tape media). Migration will then be performed on all such volumes, beginning with the largest data set in each volume and continuing with progressively smaller data sets until another user-defined parameter, the volume's "low threshold", is reached.

Another function of DFSMS is the allocation of space for new data sets. Typically, space for a new data set will be allocated to the volume which has the most amount of free space. Frequently, however, the volume to which space is allocated is the same volume from which data sets are being migrated. Such a conflict causes contention for common resources, including volume table of contents (VTOCs), catalog entries and the like, resulting in a slowdown in data migration and/or customer workload.

Consequently, a need exists for reduced contention between data migration and space allocation as well as for increased migration speed.

SUMMARY OF THE INVENTION

The present invention provides methods and apparatus for managing data in a hierarchal storage subsystem. The method includes designating a plurality of volumes as a storage group for Level 0 storage, establishing a high threshold for the storage group, allocating space for a data set to a volume of the storage group, storing the data set to the volume, comparing the high threshold with a total amount of space consumed by all data sets stored to volumes in the storage group, and migrating data sets from the storage group to a Level 1 storage if the high threshold is less than or equal to the total amount of space used by all of the data sets stored to volumes in the storage group.

In one embodiment, high threshold are assigned to each storage group and, when the space used in a storage group reaches or exceeds the high threshold, migration of data will begin from volumes in the storage group, beginning with the volume having the least free space. Thus, contention between migration and space allocation is reduced.

In another embodiment, when a volume is selected for migration, a flag is set which prevents space in the volume from being allocated to new data sets. Upon completion of the migration, the flag is cleared and allocation is allowed. Thus, contention between migration and space allocation is avoided.

DETAILED DESCRIPTION OF THE PREFERRED EMBODIMENT

Figure 1:
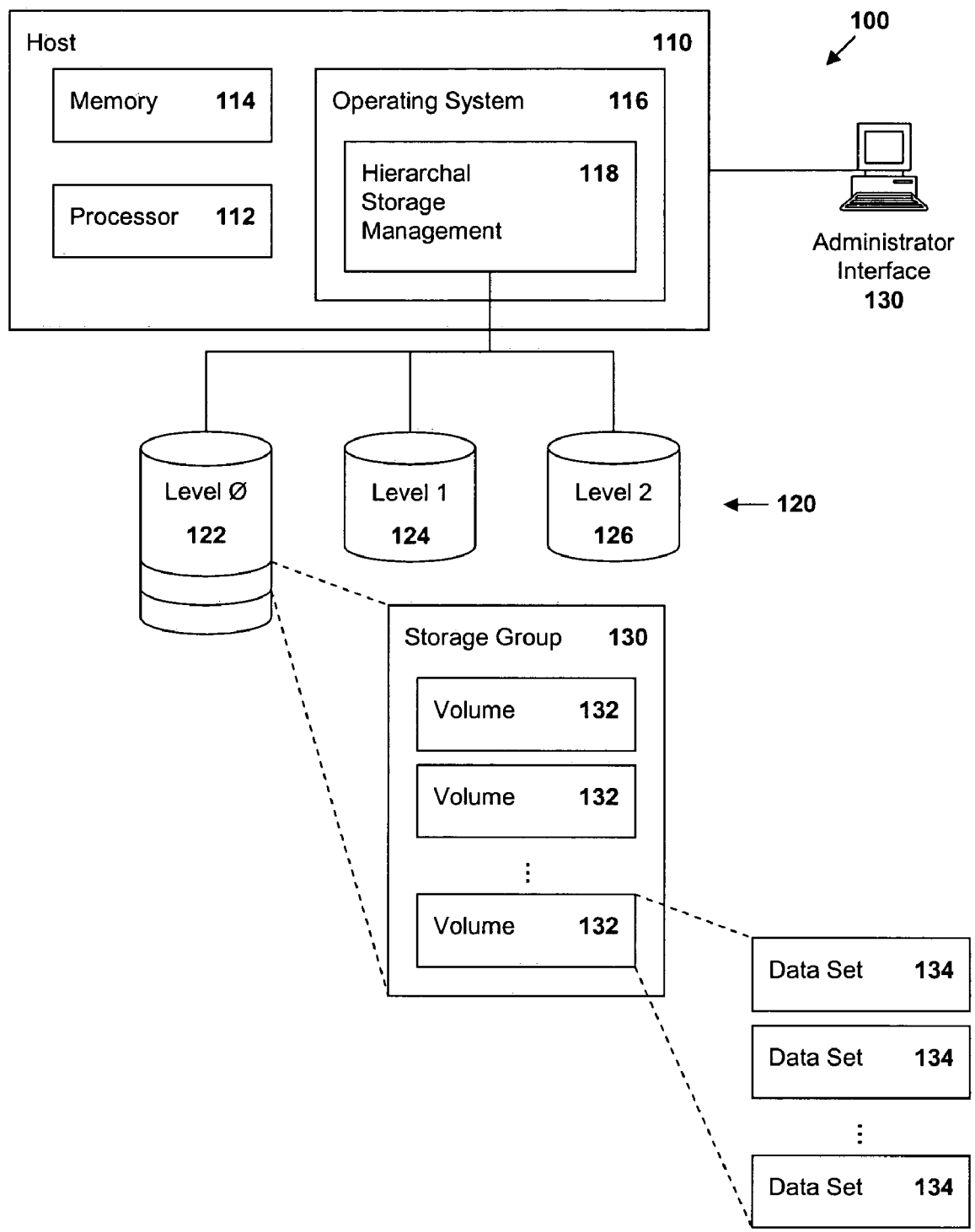
FIG. 1 is a block diagram of a hierarchal storage system in which the present invention may be incorporated.

FIG. 1 is a block diagram of a hierarchal storage system 100 in which the present invention may be incorporated. The system 100 includes a host device 110 to which is attached multiple levels of data storage devices 120 and an administrative interface, 130. The host 110 includes a processor 112, memory 114 and an operating system 116. The operating system 116 includes hierarchal storage management functions 118. For purposes of this description, the hierarchal storage manager 118 is illustrated as being operatively coupled to the storage devices 120. However, other processes in the operating system 116 and/or the host 110 may access the storage devices 120. Thus, as used herein, the term "coupled" may refer to an indirect relationship of two components, devices or subsystems as well as to a direct electrical connection between the two.

The storage devices 120 include high speed (and expensive) Level 0 storage 122, and slower (and less expensive) Level 1 storage 124. Additional levels of storage, represented in FIG. 1 as still slower (and still less expensive) Level 2 storage 126, may also be coupled to the hierarchal storage manager 118. As will be described below, volumes 132 are grouped into storage groups 130 for storing data sets 134.

By way of example and not limitation, the host 110 may be an IBM S/390, the operating system 116 may be z/OS and the hierarchal storage management functions may be provided by DFSMShsm. The Level 0 storage may be DASD devices, such as the IBM TotalStorage™ Model 2107. Level 1 storage may be DASD/tape media, such as the IBM TotalStorage Model 2105 Enterprise Storage Server or the IBM TotalStorage 3592 Enterprise Tape System.

Figure 2:
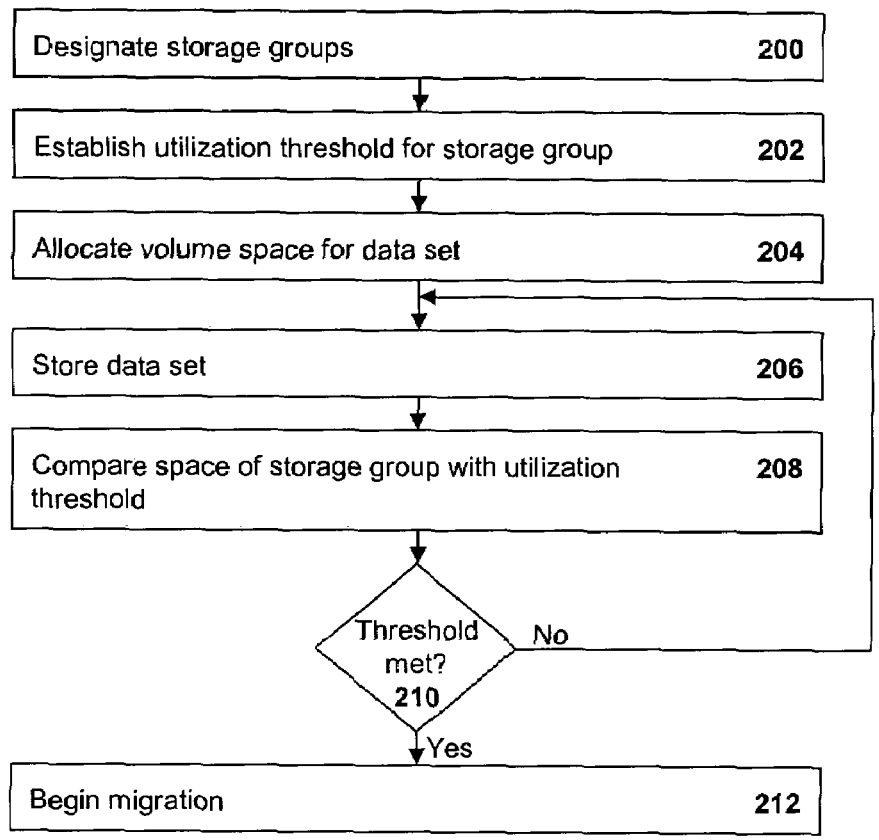
FIG. 2 is a flowchart of a method of the present invention.

FIG. 2 is a flowchart of a method of the present invention. Using DFSMShsm or its equivalent, the facility administrator designates one or more volumes as a Level 0 storage group (step 200); additional storage groups may also be similarly designated. For each storage group, a high threshold is established by the facility administrator and stored in the memory 114 (step 202) which may comprise a database, a table or the like. Space for new data sets may then be allocated to a volume of the storage group (step 204) and a data set stored in the volume (step 206). At a time defined by the administrator, DFSMShsm compares the space of any storage group with the high threshold (step 208). If the threshold has been met (step 210), that is, the amount of used space in the storage group equals or exceeds the high threshold, data sets from the volume are migrated to Level 1 storage (step 212).

Figure 3:
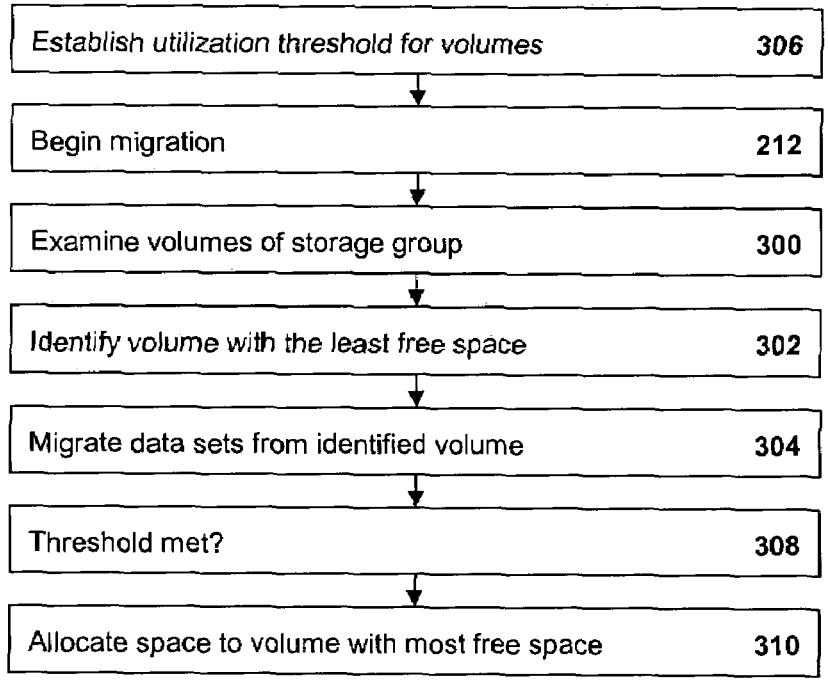
FIG. 3 is a flowchart of an embodiment of the present invention.

Referring to the flowchart of FIG. 3, in one embodiment the volumes of the storage group are examined (step 300) and the volume having the least free space is identified (step 302). Migration of data sets from the storage group then begins with the data sets stored in the identified volume (step 304).

In addition to the high threshold established for each storage group, a low threshold may be established for each volume in each storage group (step 306). When volume low thresholds are established, migration of data sets from a volume will continue until the low threshold is reached (step 308).

DFSMS may also be directed to allocate space for a new data to the volume having the most free space of all of the volumes of a storage group (step 310). In contrast, volumes having the least amount of free space are more likely to be the object of migration. Thus, the risk is reduced that the volume to which space is to be allocated is the same volume from which data sets are being migrated.

Figure 4:
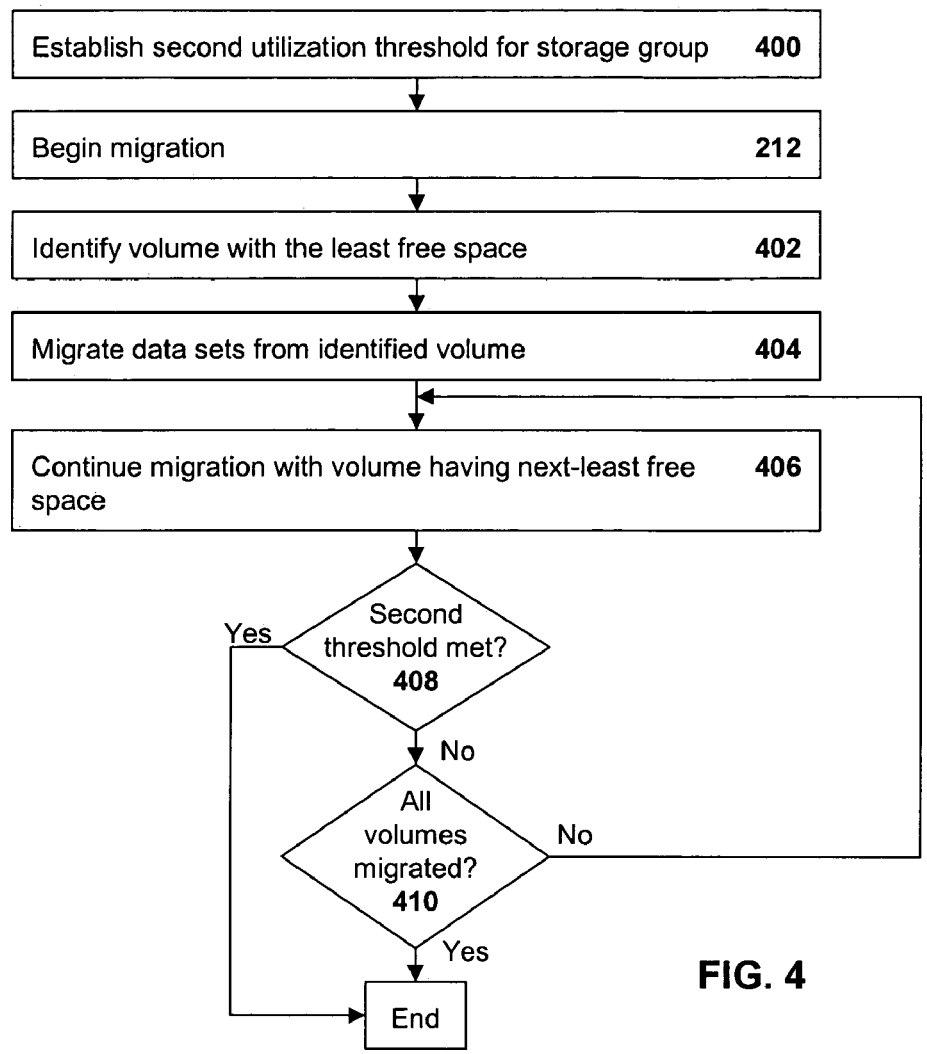
FIG. 4 is a flowchart of another embodiment of the present invention.

In another embodiment (FIG. 4), a low threshold is established for each storage group (step 400) to indicate a minimum amount of free space (or an allowable amount of used space). When migration begins, the volume having the least amount of free space of all of the volumes in the storage group is identified (step 402) and migration begins with data sets from the identified volume (step 404). Migration is next performed with data sets of the volume with the next-least amount of free space is then identified (step 406). The process continues until the low threshold has been met (step 408) or until migration has been performed on all of the volumes in the storage group (step 410), which ever first occurs.

Figure 5:
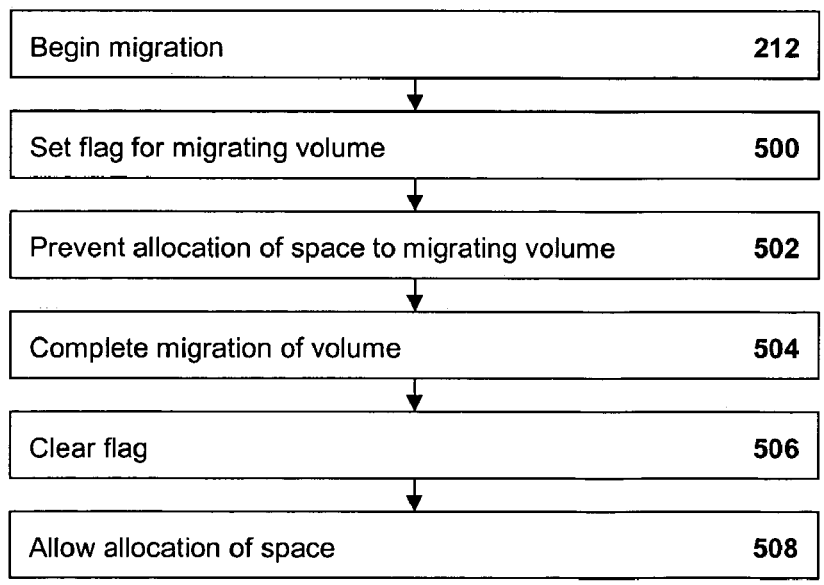
FIG. 5 is a flowchart of still another embodiment of the present invention.

In still a further embodiment (FIG. 5), when migration of data sets of a volume begins, a flag is set (step 500) which prevents space for new data sets from being allocated to the volume (step 502), thus preventing contention between migration and allocation functions. When migration from the volume is complete (step 504), the flag is cleared (step 506) and allocation is allowed (step 508.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of recordable media actually used to carry out the distribution. Examples of computer readable media include recordable-type storage media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the piinciples of the invention, the practical application, and to enable others of ordinary skill in the art to understand the invention for various embodiments with various modifications as are suited to the particular use contemplated. Moreover, although described above with respect to methods and systems, the need in the art may also be met with a computer program product storing instructions for managing hierarchal storage or with a method for deploying computing infrastructure comprising integrating computer readable code into a computing system for managing hierarchal storage.

What is claimed is:

1. A method for reducing contention between migration of data and space allocation in a hierarchal storage subsystem, comprising:
   (a) designating a plurality of volumes as a storage group for Level 0 storage;
   (b) establishing a first threshold for the storage group;
   (c) establishing a second threshold for each volume in the storage group;
   (d) allocating space for a data set to a first volume of the storage group:
   (e) storing the data set to the first volume;
   (f) comparing the first threshold with a total amount of space used by all data sets stored to all volumes in the storage group;
   (g) if the first threshold has been reached:
      identifying the volume of the plurality of volumes having the least amount of free space of all volumes in the storage group ("second volume"); and
      migrating data sets to a Level 1 storage from the storage group beginning with data sets stored in the second volume and continuing until the total amount of space used by all of the data sets stored in the second volume is less than or equal to the second threshold established for the second volume;
   (h) repeating steps (e) through (g) if the first threshold has not been reached;
   (i) identifying the volume of the plurality of volumes, other than the second volume, having the most free space of all volumes in the storage group ("third volume"); and
   (j) allocating space for a new data set to the third volume, whereby a risk is reduced that the allocation will be to space of the second volume from which data sets are being migrated.

2. The method of claim 1, further comprising:
   setting a flag to indicate that migration of data sets from the second volume has begun;
   preventing space for a new data set from being allocated to the second volume if the flag is set; and
   clearing the flag when migration of data sets from the second volume is complete, after which allocation of space to the second volume for new data sets is allowed.

3. A hierarchal storage management system in which contention between migration of data and space allocation is reduced, comprising:

a host computer to which are attached at least first and second levels of data storage, the first level of data storage configured into at least a first storage group having space allocated for storing a plurality of volumes of data sets;

means for establishing a first threshold for the first storage group;

means for establishing a second threshold for each volume in the first storage group;

means for allocating space for a data set to a first volume of the first storage group;

means for storing the data set to the first volume;

means for comparing the first threshold with a total amount of space consumed by all data sets stored to all volumes in the first storage group;

means for identifying the volume having the least amount of free space of all volumes in the storage group ("second volume");

means for migrating data sets from the first storage group to the second level of storage beginning with the second volume if the first threshold is less than or equal to the total amount of space used by all of the data sets stored to the volumes in the first storage group and continuing until the total amount of space used by all of the data sets stored in the second volume is less than or equal to the second threshold established for the second volume;

means for identifying the volume of the plurality of volumes, other than the second volume, having the most free space of all volumes in the storage group ("third volume"); and means for allocating space for a new data set to the third volume, whereby a risk is reduced that the allocation will be to space of the second volume from which data sets are being migrated.

4. The system of claim 3, further comprising:

means for setting a flag to indicate that migration of data sets from the second volume has begun;

means for preventing space for a new data set from being allocated to the second volume if the flag is set; and means for clearing the flag when migration of data sets from the second volume is complete, whereby allocation of space to the second volume for new data sets is allowed.

5. The system of claim 3, wherein the first level of storage comprises DASD storage devices.

6. The system of claim 3, wherein the second level of storage comprises tape storage.

7. A computer program product stored on a computer readable medium usable with a programmable computer, the computer program product having computer-readable code embodied therein for reducing contention between migration of data and space allocation in a hierarchal storage subsystem, the computer-readable code comprising instructions for:

(a) designating a plurality of volumes as a storage group for Level 0 storage;

(b) establishing a first threshold for the storage group;

(c) establishing a second threshold for each volume in the storage group;

(d) allocating space for a data set to a first volume of the storage group;

(e) storing the data set to the first volume;

(f) comparing the first threshold with a total amount of space consumed by all data sets stored to all volumes in the storage group;

(g) if the first threshold has been reached:
identifying the volume having the least amount of free space of all volumes in the storage group ("second volume"); and
migrating data sets to a Level 1 storage from the storage group beginning with the second volume and continuing until the total amount of space used by all of the data sets stored in the second volume is less than or equal to the second threshold for the second volume;

(h) repeating instructions (e) through (g) if the first threshold has not been reached; and (i) allocating space for a new data set to a volume, other than the second volume, of the storage group having the most free space of all of the volumes of the storage group ("third volume"), whereby a risk is reduced that the allocation will be to space of the second volume from which data sets are being migrated.

8. The computer program product of claim 7, further comprising instructions for:

setting a flag to indicate that migration of data sets from the second volume has begun;

preventing space for a new data set from being allocated to the second volume if the flag is set; and clearing the flag when migration of data sets from the second volume is complete, whereby allocation of space to the second volume for new data sets is allowed.

9. A method for deploying computing infrastructure, comprising:

integrating computer readable code into a computing system, wherein the code, in combination with the computing system, performs the following:

(a) designates a plurality of volumes as a storage group for Level 0 storage;

(b) establishes a first threshold for the storage group;

(c) establishes a second threshold for each volume in the storage group;

(d) allocates space for a data set to a volume of the storage group;

(e) stores the data set to the volume;

(f) compares the first threshold with a total amount of space consumed by all data sets stored to volumes in the storage group;

(g) if the first threshold has been reached:
identifies the volume having the least amount of free space of all volumes in the storage group; and
migrates data sets to a Level 1 storage from the storage group beginning with the identified volume and continuing until the total amount of space used by all of the data sets stored in the second volume is less than or equal to the second threshold for the second volume;

(h) repeats steps (e) thorugh (g) if the first threshold has not been reached and (i) allocates space for a new data set to a volume of the storage group, other than the second volume, having the most free space of all of the volumes of the storage group, whereby a risk is reduced that the allocation will be to space of the identified volume from which data sets are being migrated.

10. The method of claim 9, wherein the code further performs the following:

sets a flag to indicate that migration of data sets from the second volume has begun;

prevents space for a new data set from being allocated to the second volume if the flag is set; and clears the flag when migration of data sets from the second volume is complete, whereby allocation of space to the second volume for new data sets is allowed.

* * * * *